United States Patent
Okamoto

(10) Patent No.: US 6,266,764 B1
(45) Date of Patent: Jul. 24, 2001

(54) PROGRAM CONTROLLER FOR SWITCHING BETWEEN FIRST PROGRAM AND SECOND PROGRAM

(75) Inventor: Minoru Okamoto, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/271,227

(22) Filed: Mar. 17, 1999

(30) Foreign Application Priority Data

Mar. 17, 1998 (JP) .................................................. 10-067483

(51) Int. Cl.⁷ ...................................................... G06F 9/30
(52) U.S. Cl. ......................... 712/206; 712/205; 712/209; 712/212; 712/214
(58) Field of Search .................................. 712/206, 209, 712/212, 214, 215, 216, 231, 205

(56) References Cited

U.S. PATENT DOCUMENTS

| | | | |
|---|---|---|---|
| 5,131,086 | * 7/1992 | Circello et al. | 712/213 |
| 5,287,467 | * 2/1994 | Blaner et al. | 712/237 |
| 5,692,170 | * 11/1997 | Isaman | 712/244 |
| 5,758,142 | * 5/1998 | McFarling et al. | 712/239 |
| 5,784,636 | * 7/1998 | Rupp | 712/37 |
| 5,949,995 | * 9/1999 | Freeman | 712/239 |

FOREIGN PATENT DOCUMENTS 2-24721  1/1990 (JP).

* cited by examiner

Primary Examiner—John A. Follansbee
Assistant Examiner—Dzung C. Nguyen
(74) Attorney, Agent, or Firm—Ratner & Prestia

(57) ABSTRACT

A program controller for use in a processor operating on pipe-line principles includes: a first memory section for outputting an instruction contained in a first program including a plurality of instructions; a second memory section for outputting an instruction contained in a second program including a plurality of instructions, the first program being different from the second program; a selection section for selecting either the instruction which is output from the first memory section or the instruction which is output from the second memory section; a determination section for determining whether or not the instruction selected by the selection section is an instruction for controlling the execution order of instructions; and a control section for, if the instruction selected by the selection section is determined as an instruction for controlling the execution order of instructions, controlling the selection section so as to switch from the selected instruction to the unselected instruction of either the first memory section or the second memory section.

7 Claims, 10 Drawing Sheets

FIG. 4
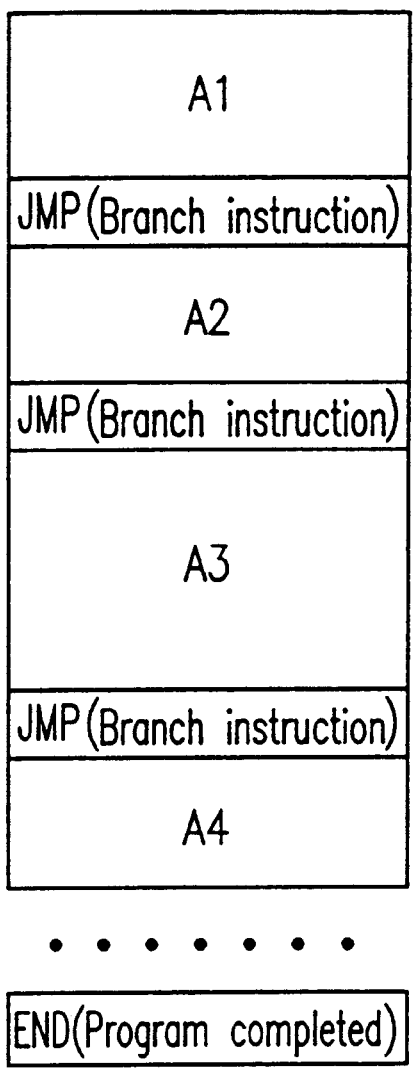
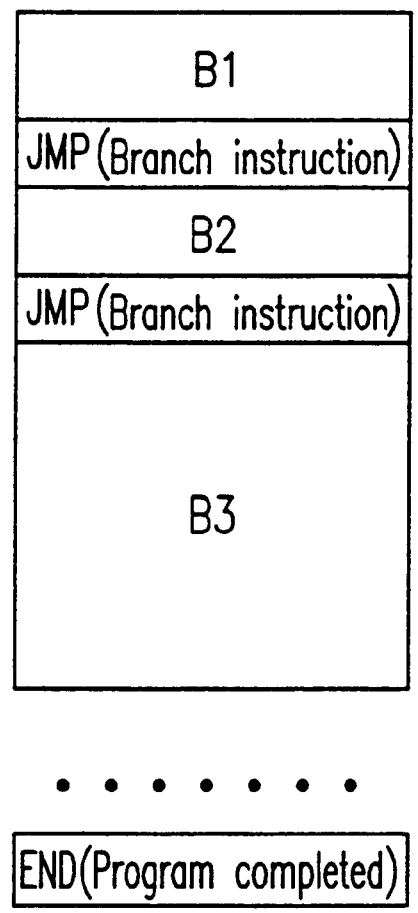

*FIG. 7*

| Value of register 675 | Operation of control circuit 680 following branch instruction | |
|---|---|---|
| | Control signal 682 | Program execution |
| 0 | If 0 was the output, then output 1<br>If 1 was the output, then output 0 | Switch executed program from A to B or from B to A |
| 1 | Output 2, and then 0 | Execute NOP instruction, and then execute instruction stored in program memory 310 |
| 2 | Output 2, and then 1 | Execute NOP instruction, and then execute instruction stored in program memory 320 |

| Address | Instruction | Outline of operation |
|---|---|---|
| N−1 | CMP A,B | Comparison between registers A and B |
| N | JMPG M | If A>B branch out to address M |
| N+1 | | Delay slot−1 |
| N+2 | | Delay slot−2 |
| N+3 | | Delay slot−3 |
| N+4 | | Delay slot−4 |
| N+5 | | Delay slot−5 |
| N+6 | | Delay slot−6 |
| ... | | |
| M | | Instruction of post-branching address |
| | | |

PROGRAM CONTROLLER FOR SWITCHING BETWEEN FIRST PROGRAM AND SECOND PROGRAM

BACKGROUND OF THE INVENTION

1. Field of the Invention

The present invention relates to a program controller for use in a processor which is capable of pipe-line operation.

2. Description of the Related Art

With the recent expansion in the applicable areas of digital signal processing, DSPs (digital signal processors) having high processing ability have been increasingly demanded. In general, a DSP executes instructions through pipe-line control. In answer to the demand for high-speed DSPs, method have been proposed for using an increased number of pipe-line stages while allocating a shorter process time for each pipe-line stage.

In a pipe-line control method, a number of instructions are executed in parallel with respect to the time axis, the number being equal to the number of pipe-line stages. However, when executing a branch instruction that will branch out to a post-branching address, it would be impossible to previously fetch an instruction which is stored in any post-branching address before the post-branching address is calculated. Therefore, a plurality of instructions cannot be simply executed in parallel where branch instructions are involved. Accordingly, it is necessary to employ some measures for ensuring that a fetch for a post-branching instruction can occur only after a corresponding post-branching address has been calculated and set in a program counter. One proposed method (e.g., Japanese Laid-open Publication No. 62-54342) is a so-called delayed branch technique where post-branching instructions are always executed after the execution of one or more instructions that are stored following a branch instruction. According to the delayed branch technique, for each branch instruction the programmer or compiler must state a predetermined number of instructions (i.e., delay slots) that will always be executed following the branch instruction.

FIG. 10 illustrates a processing timing scheme for delayed branching by a pipe-line processor having seven pipe-line stages. In FIG. 10, IF1 and IF2 represent the timing for instruction fetching; D1 and D2 represent the timing for instruction decoding; MA represents the timing for data memory access; OF represents the timing for operand fetching: and EX represents the timing for execution of calculation. In the timing scheme shown in FIG. 10, a processor decodes a conditional branch instruction of address N to know that it is a branch instruction (time 1000), and fetches an operand storing a post-branching address N (time 1010). However, it is impossible to begin fetching the instruction of post-branching address N at either time 1000 or 1010 because whether or not the branching will actually take place is governed by the result of an immediately preceding instruction, i.e., a comparison calculation instruction of address N–1.

The processor completes at time 1010 a comparison calculation between the values held in respective registers in accordance with the comparison calculation instruction of address N–1, and stores the result of the comparison calculation in a flag register. Based on this result, the processor completes at time 1020 the execution of the branch instruction of address N so that a fetch for the instruction of post-branching address M is begun if the condition is met, for example.

Thus, the processor cannot begin fetching the post-branching instruction of address N until the branch instruction of address N is completed. In this exemplary processor which has seven pipe-line stages, six instructions (addresses N+1 to N+6) following the branch instruction are the delay slots that are executed in parallel with the branch instruction of address N.

Clearly, the number of delay slots increases as the number of pipe-line stages of a processor, to which the delayed branch technique is applied, increases. However, given the large number of delay slots, there may not be enough instructions that conveniently need to be executed. In the case where no actual instruction can be conveniently stated as a given delay slot, an "NOP instructions" (i.e., a no-operation instruction or an instruction that does not result in the execution of any calculation) is described as a delay slot. However, this presents a problem in that a number of clock cycles are run in vain every time the branch instruction is executed.

On the other hand, a DSP may be required to be capable of performing a plurality of processes, e.g., voice compression and construction of data sequences for communications, rather than only performing a voice compression process.

SUMMARY OF THE INVENTION

A program controller for use in a processor operating on pipe-line principles according to the present invention includes: a first memory section for outputting an instruction contained in a first program including a plurality of instructions; a second memory section for outputting an instruction contained in a second program including a plurality of instructions, the first program being different from the second program; a selection section for selecting either the instruction which is output from the first memory section or the instruction which is output from the second memory section; a determination section for determining whether or not the instruction selected by the selection section is an instruction for controlling the execution order of instructions; and a control section for, if the instruction selected by the selection section is determined as an instruction for controlling the execution order of instructions, controlling the selection section so as to switch from the selected instruction to the unselected instruction of either the first memory section or the second memory section.

In one embodiment of the invention, the instruction for controlling the execution order of instructions is an instruction dictating branching out to a predetermined address.

In another embodiment of the invention, the instruction for controlling the execution order of instructions is an instruction dictating storing an address of an instruction to be executed next in a memory device and branching out to a predetermined address.

In still another embodiment of the invention, the control section controls the selection section so as to switch from the selected instruction to the unselected instruction of either the first memory section or the second memory section when the execution of one of the first and second programs is completed.

In still another embodiment of the invention, the program controller further includes: an information retention section for retaining information indicating that the execution of at least one of the first and second programs is completed; and an NOP instruction retention section for outputting an NOP instruction, wherein, in a situation where the information retained by the information retention section indicates that the execution of the second program is completed and the instruction selected by the selection section is the instruction which is output from the first memory section, and if the determination section determines that the instruction selected by the selection section is an instruction for controlling the execution order of instructions, the control section controls the selection section so as to select the NOP instruction output from the NOP instruction retention section for a predetermined number of cycles and thereafter select the instruction which is output from the first memory section.

In still another embodiment of the invention, the control section controls the selection section so as to switch from the selected instruction to the unselected instruction of either the first memory section or the second memory section when priority is given to the execution of one of the first and second programs over the other one of the first and second programs.

In still another embodiment of the invention, the program controller further includes: an information retention section for retaining information indicating priority for the execution of the first program and priority for the execution of the second program; and an NOP instruction retention section for outputting an NOP instruction, wherein, in a situation where the information retained by the information retention section indicates that priority is given to the execution of the first program over the second program and the instruction selected by the selection section is the instruction which is output from the first memory section, and if the determination section determines that the instruction selected by the selection section is an instruction for controlling the execution order of instructions, the control section controls the selection section so as to select the NOP instruction output from the NOP instruction retention section for a predetermined number of cycles and thereafter select the instruction which is output from the first memory section.

Thus, the invention described herein makes possible the advantage of providing a program controller capable of efficiently executing branch instructions in a processor having a large number of pipe-line stages, thereby making it possible to perform a plurality of processes without incorporating a complicated control mechanism.

This and other advantages of the present invention will become apparent to those skilled in the art upon reading and understanding the following detailed description with reference to the accompanying figures.

BRIEF DESCRIPTION OF THE DRAWINGS

FIG. 4 is a diagram illustrating exemplary programs stored in program memories according to the present invention.

FIG. 7 is a table illustrating various operations of a control circuit included in a program controller according to the present invention.

DESCRIPTION OF THE PREFERRED EMBODIMENTS

Hereinafter, the present invention will be described by way of examples, with reference to the accompanying figures.

EXAMPLE 1

Figure 1:
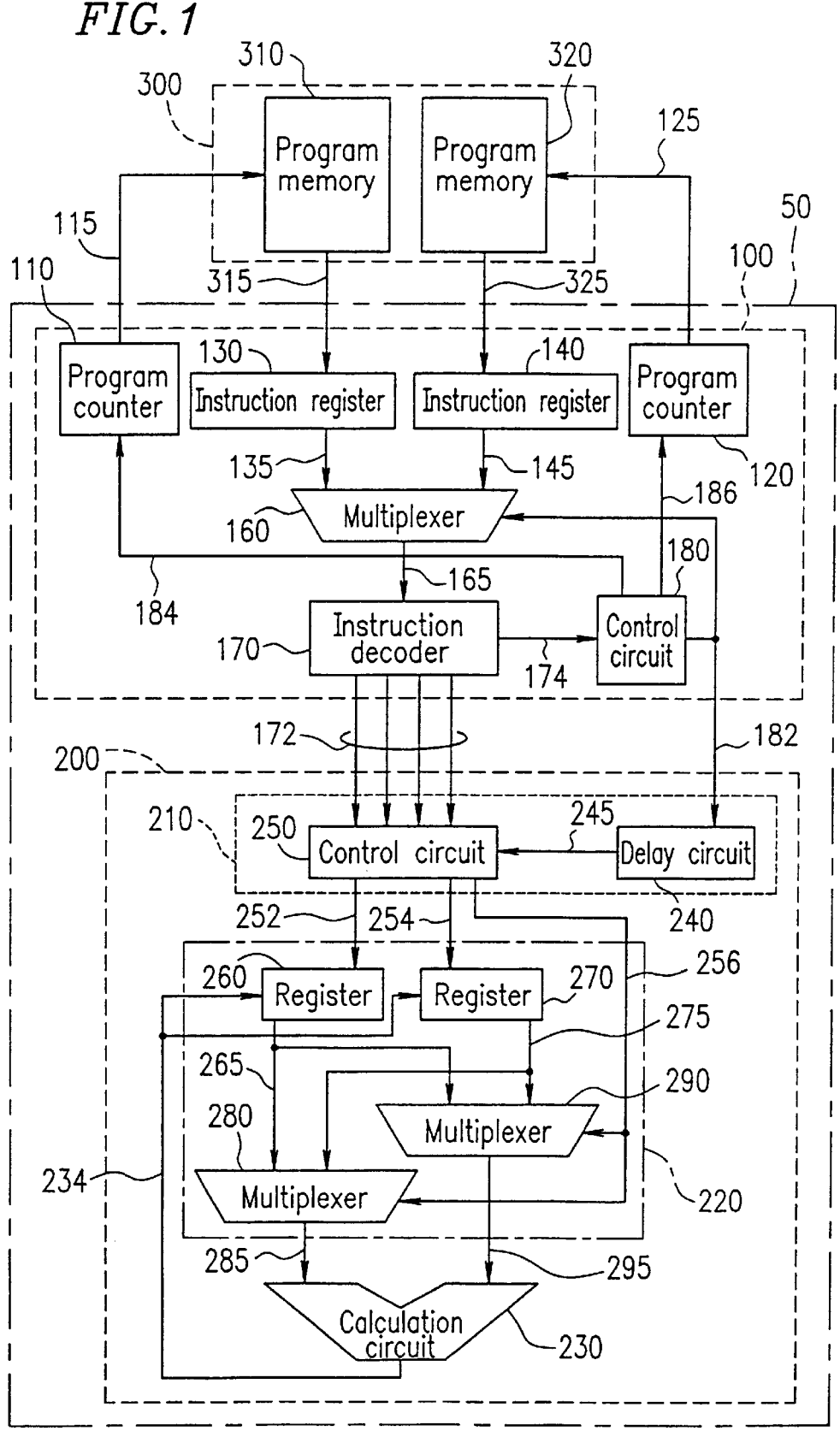
FIG. 1 is a block diagram illustrating the structure of a processor incorporating a program controller according to the present invention.

FIG. 1 is a block diagram illustrating the structure of a processor 50 incorporating a program controller 100 according to the present invention. The processor 50 executes a program which is stored in a memory 300. The processor 50 includes a controller 100 and a calculator 200.

The controller 100 includes program counters 110 and 120, an instruction register (first memory section) 130, an instruction register (second memory section) 140, a multiplexer (selection section) 160, an instruction decoder (determination section) 170, and a control circuit (control section) 180.

The program counter 110 retains the address of a given instruction to be executed within a program memory 310. The program counter 120 retains the address of a given instruction to be executed within a program memory 320. The values retained in the program counters 110 and 120 are updated by an incremental operation, as well as by the execution of a branch instruction. The incremental operation of the program counter 110 is controlled by a control signal 184. The incremental operation of the program counter 120 is controlled by a control signal 186. An incremental operation takes place when its associated control signal 184 or 186 is "1"; no incremental operation takes place when its associated control signal 184 or 186 is "0". As used herein, an incremental operation is defined as the act of updating a value retained in a program counter by the addition of a predetermined value (e.g., 1). A branch operation is defined as an instruction which instructs branching to predetermined addresses (which are herein referred to as "post-branching addresses"). In the present specification, an "instruction for controlling the execution order of instructions" is defined to include branch instructions, subroutine call instructions, and the like.

The program counter 110 outputs an address signal 115 to the program memory 310. The program memory 310 outputs as an instruction 315 to the instruction register 130 an instruction which is stored at an address that is designated by the address signal 115. The instruction register 130 retains the instruction 315 which has been output from the program memory 310.

Similarly, the program counter 120 outputs an address signal 125 to the program memory 320. The program memory 320 outputs as an instruction 325 to the instruction register 140 an instruction which is stored at an address that is designated by the address signal 125. The instruction register 140 retains the instruction 325 which has been output from the program memory 320.

The multiplexer 160 selects for execution one of the instruction 135 (which is output from the instruction register 130) and the instruction 145 (which is output from the instruction register 140). The selected instruction is output to the instruction decoder 170 as an instruction 165. The selection operation of the multiplexer 160 is controlled by a control signal 182 which is output from the control circuit 180. When the value of the control signal 182 is "0", the multiplexer 160 selects the instruction register 130; and when the value of the control signal 182 is "1", the multiplexer 160 selects the instruction register 140.

The instruction decoder 170 decodes the instruction selected by the multiplexer 160 to determine the content of the operation of the calculator 200. In accordance with the determined content of the operation, the instruction decoder 170 outputs a control signal 172 for controlling the control circuit 250 of the calculator 200. The instruction decoder 170 also determines whether or not the instruction that has been selected by the multiplexer 160 is an instruction for controlling the execution order of instructions. The instruction decoder 170 outputs the result of the determination as a control signal 174 for controlling the control circuit 180. If the instruction selected by the multiplexer 160 is determined as an instruction for controlling the execution order of instructions, the instruction decoder 170 outputs a value "1" as the control signal 174. If the instruction selected by the multiplexer 160 is not an instruction for controlling the execution order of instructions, the instruction decoder 170 outputs a value "0" as the control signal 174.

The control circuit 180 generates the control signal 182 based on the control signal 174, which is output from the instruction decoder 170. Specifically, after the lapse of two cycles from the value of the control signal 174 rising from "0" to "1", the control circuit 180 inverts the value of the control signal 182 between "0" and "1". The control circuit 180 leaves the value of the control signal 182 unchanged unless the control signal 174 rises from "0", to "1". The control signal 182 is employed to control the multiplexer 160. The control signal 182 is also output to a delay circuit 240. The control circuit 180 also generates the control signals 184 and 186 based on the control signal 174. Specifically, after the lapse of one cycle from the value of the control signal 174 rising from "0" to "1", the control circuit 180 inverts the values of the control signals 184 and 186 between "0" and "1". The control signals 184 and 186 are employed to control the incremental operations of the program counters 110 and 120.

The present invention selectively executes one of a plurality of programs which are stored in the program memories 310 and 320. Hence, the program controller of the present invention will prove extremely useful when combined with a calculator for performing various calculations (e.g., numerical calculations, logic calculations, or address calculations) while efficiently switching between various storable resources (e.g., register files for temporarily retaining calculation results such as addition, multiplication, etc.) for use in one of a plurality of programs. The calculator shown in FIG. 1 is one such example, as will be described below.

The calculator 200 includes a calculation control section 210, a register section 220, and a calculation circuit 230. The calculation circuit 230 can be an adder, for example. The calculation control section 210 controls the register section 220 in accordance with a control signal which is output from the controller 100. The register section 220 temporarily stores the results of a calculation by the calculation circuit 230. The calculation circuit 230 calculates the data which is output from the register section 220.

The calculation control section 210 includes the delay circuit 240 and the control circuit 250. The delay circuit 240 delays the control signal 182 from the control circuit 180 by a predetermined number of cycles. The output signal from the delay circuit 240 is supplied to the control circuit 250 as a control signal 245. The control circuit 250 generates control signals 252 and 254 based on the control signal 172 from the instruction decoder 170 and the control signal 245 from the delay circuit 240. The control circuit 250 sets the value of either the control signal 252 or the control signal 254 at "1" only when the control signal 172 instructs writing a calculation result 234 to a register 260 or 270. Specifically, the control circuit 250 sets the value of the control signal 252 at "1" in the case where the control signal 172 instructs writing to the register 260 or 270 and the value of the control signal 245 is "0". The control circuit 250 sets the value of the control signal 254 at "1" in the case where the control signal 172 instructs writing to the register 260 or 270 and the value of the control signal 245 is "1". In all other cases, the control circuit 250 sets the values of the control signals 252 and 254 at "0". The control signal 252 is employed to control the writing to the register 260, whereas the control signal 254 is employed to control the writing to the register 270. The control circuit 250 outputs the input control signal 245, without altering it, as a control signal 256. The control signal 256 controls the operations of multiplexers 280 and 290.

The register section 220 includes the registers 260 and 270 as well as the multiplexers 280 and 290. The registers 260 and 270 are registers for temporarily retaining the data which is calculated by the calculation circuit 230. The register 260 is associated with the program memory 310, whereas the register 270 is associated with the program memory 320. The data retained in the registers 260 and 270 is updated in accordance with the calculation result 234 which is output from the calculation circuit 230. The writing to the register 260 is controlled by the control signal 252, whereas the writing to the register 270 is controlled by the control signal 254. The value"0". of the control signals 252 and 254 indicates that writing is prohibited (disabled state). The value "1" of the control signals 252 and 254 indicates that writing is allowed ("enabled" state). Each of the registers 260 and 270 may consist of a plurality of registers. Based on the control signal 256 from the control circuit 250, the multiplexers 280 and 290 select one of the registers 260 and 270 that corresponds to a program which is being executed, and output the content of that register to the calculation circuit 230. Each of the multiplexers 280 and 290 selects the register 260 when the value of the control signal 256 is "0", and selects the register 270 when the value of the control signal 256 is "1". In the case where each of the registers 260 and 270 consists of a plurality of registers, the multiplexers 280 and 290 will also consist of as many multiplexers as there are registers in each register 260 or 270.

The calculation circuit 230 subjects data 285 which is output from the multiplexer 280 and data 295 which is output from the multiplexer 290 to a predetermined calculation. The calculation circuit 230 outputs the result of the predetermined calculation to the registers 260 and 270 as the calculation result 234. The calculation circuit 230 can perform various calculations, e.g., addition,subtraction, multiplication,etc. However, the description of the content of any specific calculation is irrelevant to the present invention and therefore is omitted in the present specification.

The memory 300 includes the program memories 310 and 320. As described above, the program memory 310 outputs as the instruction 315 to the instruction register 130 an instruction which is stored in the address that is designated by the address signal 115. Similarly, the program memory 320 outputs as the instruction 325 to the instruction register 140 an instruction which is stored in the address that is designated by the address signal 125.

Herein, it is assumed that the program memory 310 stores a program A and that the program memory 320 stores a program B which is distinct from program A. In order for the processor 50 to alternately execute programs A and B in a parallel manner, it is preferable that programs A and B do not share any data (e.g., calculation results) in such a manner that a calculation result of program A is employed in a subsequent process by program B, for example. Program A may be an audio compression program, for example; program B may be a control program for various devices (e.g., key input interface, liquid crystal display, and the like). It is further assumed that each of programs A and B contains a branch instruction.

Figure 2:
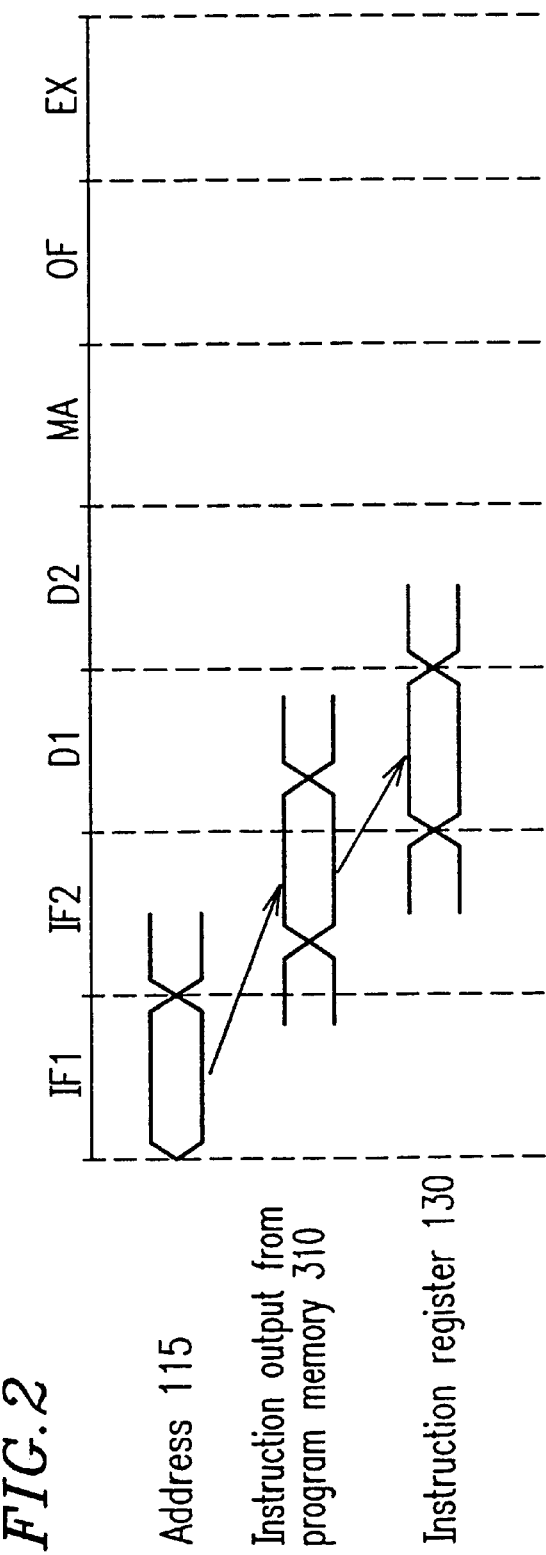
FIG. 2 is a timing diagram illustrating an exemplary operation of a program controller according to the present invention.

FIG. 2 is a timing diagram illustrating an exemplary timing scheme of an operation of the program controller 100 in the processor 50. Herein, it is assumed that seven pipe-line stages are employed in the pipe-line operation of the processor 50. As shown in FIG. 2, each pipe-line stage includes: two cycles of instruction fetching (IF1 and IF2); two cycles of instruction decoding (D1 and D2); access (MA) to data memory; operand fetching (OF); and execution of calculation and storage of calculation results (EX).

In accordance with the controller 100, if the multiplexer 160 is controlled so as to select the instruction 135 which is output from the instruction register 130, the program counter 110 in the controller 100 of the processor 50 outputs an address signal 115 to be accessed to the program memory 310 at stage IF1. The program memory 310 outputs as the instruction 315 to the instruction register 130 an instruction which is stored at the address that is designated by the address signal 115 at IF2. The instruction register 130 stores the instruction 315 at stage D1. It should be noted that the program counter 110, the program memory 310, and the instruction register 130 operate in parallel with respect to the time axis, so that the respective pipe-line stages are transacted in parallel with respect to the time axis. For example, while the program memory 310 is outputting the instruction which is stored at the address that is designated by the address signal 115 as the instruction 315 at stage IF2, the program counter 110 outputs, at stage IF1, an address which is subsequent to that address to the program memory 310 as the address signal 115. Concurrently, at stage D1, the instruction register 130 stores an instruction which is stored in an address immediately preceding the instruction which is being output at stage IF2.

Hereinafter, an operation by the processor 50 of executing programs A and B will be described, with respect to a case where the processor 50 is dictated to execute program A with a higher priority in its initial state (which may occur immediately after resetting, for example). It is assumed that in the initial state the multiplexer 160 of the controller 100 is controlled so as to select the instruction 135 which is output from the instruction register 130. It is also assumed that the respective elements of the processor 50 are controlled so as to utilize the program counter 110 and the register 260, which are elements associated with the program memory 310 for storing program A. In other words, it is assumed that the values of the control signals 174, 182, 186, 245, 252, 254, and 256 are all "0", and that the value of the control signal 184 is "1".

Since the control signal 184 has the value "1", the program counter 110 outputs an incremental value stored therein to the program memory 310 as the address signal 115 at stage IF1 until a branch instruction is read from the program memory 310 storing program A, the incremental value being increased by an increment of 1 each time. Once the address signal 115 is output to the program memory 310, the program memory 310 outputs the instruction 315 which is stored in the address that is designated by the address signal 115 at stage IF2. At stage D1, the instruction register 130 stores the instruction 315 which is output from the program memory 310. Since the control signal 182 is "0", the multiplexer 160 selects the instruction 135 which is fed from the instruction register 130, and outputs it as the instruction 165 to the instruction decoder 170. At stage D2, the instruction decoder 170 decodes the received instruction 165 (i.e., the instruction stored in the program memory 310), and outputs the control signal 172 to the control circuit 250 of the calculator 200.

Following stage D2, data memory access and operand fetching occur at stage MA and stage OF, respectively. The description thereof is omitted since these operations are similar to that of conventional processors performing conventional pipe-line operations.

Hereinafter, an exemplary operation of the calculator 200 will be described, assuming that an instruction has been issued that the data retained in the register 260 or 270 be output to the calculation circuit 230 for calculation, so that the calculation result 234 is written to the register 260 or 270. In this case, the control signal 172 which is output from the instruction decoder 170 is a signal which instructs that the calculation result 234 be written to the register 260 or 270.

The delay circuit 240 in the calculation control section 210 receives the control signal 182 which is output from the control circuit 180 in the controller 100. The delay circuit 240 delays the control signal 182 by one cycle (from stage OF to stage EX), and outputs the delayed signal to the control circuit 250 as the control signal 245. Based on the control signal 172 (which instructs writing that the calculation result 234 be written to the register 260 or 270), the control circuit 250 outputs the control signal 252 or 254 in accordance with the value of the control signal 245. Since the control signal 245 has the value "0", the control circuit 250 changes the value of the control signal 252 to "1", while leaving the value of the control signal 254 unchanged at "0". Since the control signal 245 has the value "0", the control circuit 250 changes the value of the control signal 256 to "0" and outputs the control signal 256 to the multiplexers 280 and 290.

As described above, each of the multiplexers 280 and 290 selects one of the registers 260 and 270 in accordance with the value of the control signal 256. Since the value of the control signal 256 is "0", both multiplexers 280 and 290 select the register 260. The multiplexer 280 outputs the content of data 265 which is output from the register 260 to the calculation circuit 230 as data 285. The multiplexer 290 outputs the content of the data 265 to the calculation circuit 230 as the data 295. The calculation circuit 230 subjects the data 285 and 295 to a calculation, and outputs the calculation result 234. Now, since the value of the control signal 252 is "1", indicating that the writing of the calculation result 234 to the register 260 is enabled, the content of the calculation result 234 (which is output from the calculation circuit 230) is written to the register 260. On the other hand, since the value of the control signal 254 is "0", indicating that the writing of the calculation result 234 to the register 260 is disabled, the content of the calculation result 234 (which is output from the calculation circuit 230) is not written to the register 270.

As described above, when executing program A, the operations from stage IF1 to stage EX in each one of the instructions contained in program A are performed. The processor 50 performs a pipe-line operation, that is, when the operation of a given pipe-line stage for one instruction is occurring, other pipe-line stages in the six instructions that are stored in the preceding and following addresses in the program memory 310 also occur.

The instruction decoder 170 in the controller 100 keeps outputting the value "0" as the control signal 174 unless a branch instruction is output from the multiplexer 160. Since the value of the control signal 174 remains at "0", the control signals 182, 184, and 186 within the controller 100 do not change. Therefore, the instructions stored in the program memory 310 are sequentially read and executed until a branch instruction is decoded by the instruction decoder 170. For example, if the program counter 110 outputs a value "X" as the address signal 115 at stage IF1 of an instruction which is stored at address X in the program memory 310, and the processing of the instruction proceeds to stage IF2, the program counter increases its stored value by an increment of 1 so as to output "X+1" as the address signal 115, whereby the operation of stage IF1 of an instruction stored in address X+1 occurs. Thus, the processor 50 will sequentially execute the instructions contained in program A, stored in the program memory 310, until a branch instruction is read from the program memory 310.

Since the value of the control signal 174 output from the instruction decoder 170 in the controller 100 does not change, the values of the control signals 245 and 256 do not change, either. As a result, the register 260 is used for storing the calculation result from the calculation circuit 230. Specifically, the data stored in the register 260 is read out into the calculation circuit 230 so as to be subjected to some calculation thereby, and the calculation result from the calculation circuit 230 is stored in the register 260 again.

The above-illustrated calculation is simplified for clarity and conciseness. In practice, however, the register 260 may be a plurality of registers, e.g., first, second, and third registers. Then, the calculation circuit 230 may perform a calculation by adding the data stored in the second register to the data stored in the first register, and the calculation result may be stored in the third register.

While the value of the control signal 174 remains at "0", the value of the control signal 186 remains at "0" so that an incremental operation does not occut in the program counter 120. As a result of the absence of incremental operations in the program counter 120, no instructions contained in program B stored in the program memory 320 will be newly read into the instruction register 140. While the value of the control signal 174 remains at "0", the writing to the register 270 is disabled, so that the content of the register 270 will not be changed.

Next, an operation of the processor 50 which occurs when a branch instruction is read from the program memory 310 in the above-described example will be described.

Figure 3:
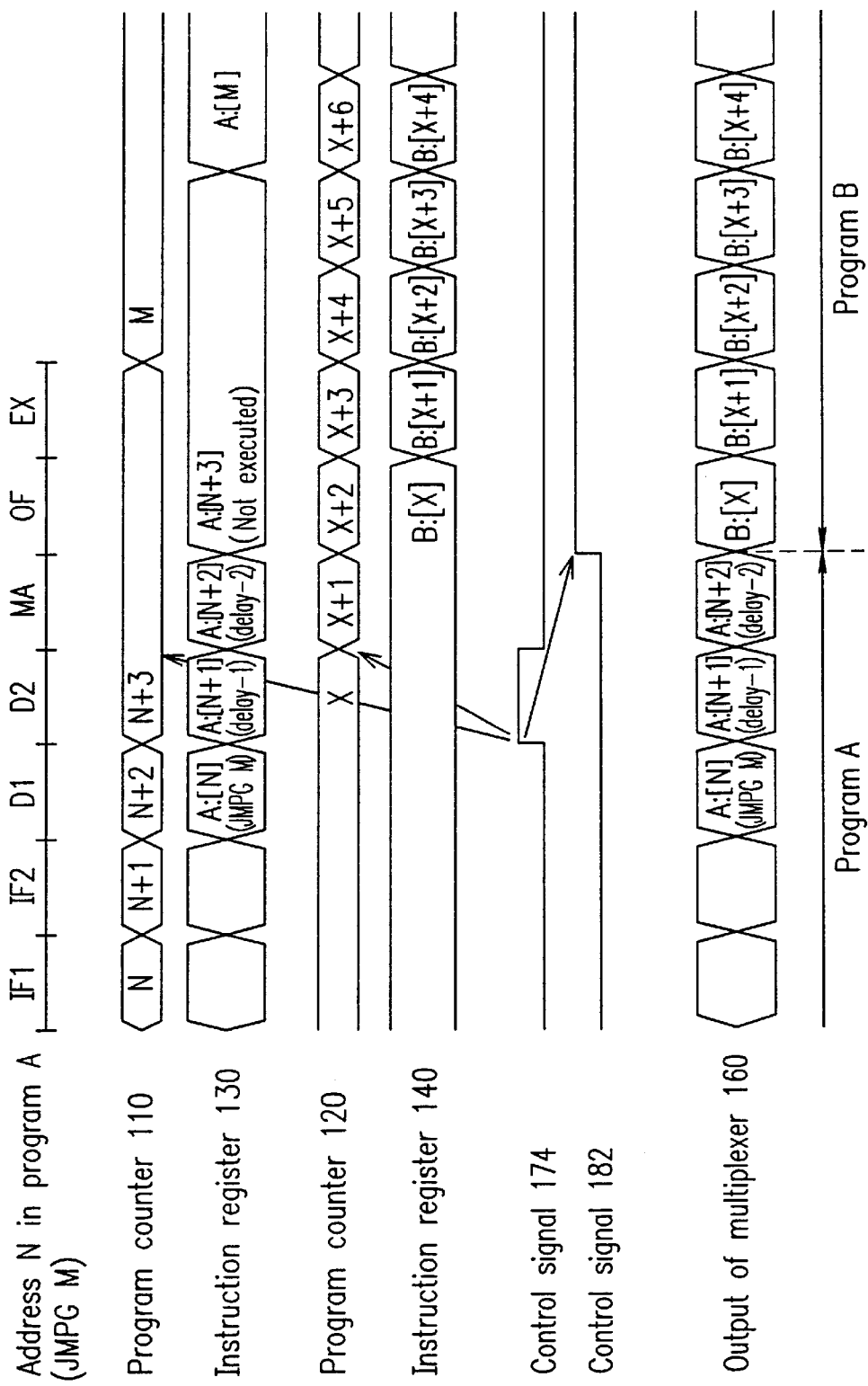
FIG. 3 is a timing diagram illustrating an operation in which a program controller according to the present invention has read a branch instruction.

FIG. 3 is a timing diagram illustrating an operation in which the program controller 100 has read a branch instruction. It is assumed that the branch instruction which has been read by the program controller 100 was stored at address N in the program memory 310. In the following description, an instruction which is stored at address N in the program memory 310 storing program A will be denoted as "A:[N]".

The instruction decoder 170 outputs the control signal 174 having the value "1" if the decoded instruction is a branch instruction. It is assumed that the branch instruction A:[N] is an instruction ("JMPG M") to branch out to address M. As described above, as the value of the received control signal 174 shifts from "0" to "1", the control circuit 180 inverts the values of the output control signals 184 and 186 after the lapse of one cycle, and inverts the value of the control signal 182 after the lapse of two cycles. Since the value of the control signal 184 being output by the control circuit 180 is "1", the control circuit 180 inverts it to "0"; since the value of the control signal 182 being output by the control circuit 180 is "0", the control circuit 180 inverts it to "1".

Two cycles after the instruction decoder 170 decodes the branch instruction, the control signal 182 shifts to "1". As the control signal 182 shifts to "1", the multiplexer 160 selects the instruction 145 which is output from the instruction register 140. The multiplexer 160 outputs the content of the instruction 145 to the instruction decoder 170 as the instruction 165.

Thus, the multiplexer 160 selects the instruction 145 which is output from the instruction register 140 two cycles after a branch instruction is decoded by the instruction decoder 170. Therefore, the two instructions A:[N+1] and A:[N+2], which follow the branch instruction A:[N], are read out into the instruction register 130 from the program memory 310 following the reading of the branch instruction, and are input to the instruction decoder 170. Immediately after the instruction A: [N+2] is input to the instruction decoder 170, an instruction which has been read from the program memory 320 to the instruction register 140 is input to the instruction decoder 170.

Assuming that a value "X" was retained in the program counter 120 before the value of the control signal 186 shifts to "1", an instruction B: [X] will be read from the program memory 320 to the instruction register 140 immediately after the instruction A: [N+2] is input to the instruction decoder 170.

The instruction decoder 170 changes the value of the control signal 186 to "1" after the lapse of one cycle from decoding the branch instruction A:[N]. The program counter 120 begins an incremental operation (by an increment of 1) as the control signal 186 shifts to "1". Therefore, one cycle after the instruction decoder 170 decodes the branch instruction, the program counter 120 will output the address signal 125 whose content is an incremented address X+1. The instruction register 140 will store the instruction B:[X+1] two cycles after the program counter 120 outputs the address signal 125 whose content is address X+1. That is, the instruction register 140 will store the instruction B:[X+1] three cycles after the instruction decoder 170 decodes the branch instruction A:[N].

As described above, the value of the control signal 182 shifts to "1" two cycles after the instruction decoder 170 decodes the branch instruction A:[N]. Therefore, the value of the control signal 182 becomes "1" one cycle before the instruction register 140 stores the instruction B:[X+1]. Since the instruction B:[X] is stored in the instruction register 140 before the instruction B:[X+1], the instruction decoder 170 decodes the instruction B:[X] one cycle before decoding the instruction B:[X+1].

Thus, the order of the instructions which are input to the instruction decoder 170 after the instruction A: [N+2] will be B:[X], B:[X+1], B:[X+2], B:[X+3], ... etc. Therefore, the order of instruction execution by the processor 50 after the branch instruction A:[N] will be A:[N], A:[N+1], A:[N+2], B:[X], B:[X+1], B:[X+2], B:[X+3], ... etc.

Hereinafter, a calculation operation by the calculation section 200 when the processor controller 100 has read a branch instruction from address N in the program memory 310 will be described. The delay circuit 240 outputs the control signal 245, which is obtained by delaying the control signal 182 by two cycles. Therefore, the delay circuit 240 changes the value of the control signal 245 to "1" two cycles after the control signal 182 shifts to "1". As the control signal 245 shifts to "1", the control circuit 250 changes the value of the control signal 256 to "1". The control circuit 250 changes the value of the control signal 254 to "1" when the value of the control signal 245 is at "1" and the control signal 172 instructs writing to the register 260 or 270. As the control signal 256 shifts to "1", the multiplexers 280 and 290 select the register 270 so that the content of the register 270 is output to the calculation circuit 230. When the control signal 172 instructs writing to the register 260 or 270, the control signal 254 shifts to "1", so that the calculation result 234 is written to the register 270. However, the calculation result 234 from the calculation circuit 230 is not written to the register 260 because the control signal 252 remains at "0". Thus, the register used by the calculation section 200 is switched from the register 260 to the register 270.

As the control signal 184 shifts to "0", the program counter 110 stops its incremental operation. Since the control signal 184 shifts to "0" one cycle after the control signal 174 shifts from "0" to "1" as described above, the program counter 110 stops the incremental operation while retaining address "N+3". Thereafter, if the branching conditions are met at the end of stage EX of the branch instruction A:[N], the program counter 100 loads post-branching address "M". If the branching conditions are not met, the program counter 110 retains address "N+3" without updating its value. FIG. 3 illustrates the operation of the controller 100 when the branching conditions are met.

The processor 50 will perform the same operation as above (where a branch instruction is read from the program memory 310) also in the case where a branch instruction is read from the program memory 320. Specifically, the instruction decoder 170 changes the value of the control signal 174 from "0" to "1" if the decoded instruction is a branch instruction. The control circuit 180 inverts the value of the control signal 182 from "1" to "0" two cycles after the control signal 174 shifts from "0" to "1". As the control signal 182 shifts to "0", the multiplexer 160 selects the instruction retained in the instruction register 130 and outputs it to the instruction decoder 170. Once the branch instruction is read from the program memory 320, the processor 50 executes the two instructions following the branch instruction and thereafter resumes the execution of program A from address M in the program memory 310.

As described above, according to the present example, if a branch instruction contained in one of program A or program B is executed, two instructions following the branch instruction are first executed, and then instructions in the other of program A or program B are executed.

FIG. 4 illustrates exemplary states of programs A stored in the program memories 310 and 320. It is assumed that a plurality of branch instructions are contained in each of programs A and B. As described above, after the execution of each branch instruction, two subsequent instructions are executed before the programs are switched. Such a set of instructions, i.e., a branch instruction and two following instructions, will be collectively referred to as a "branch instruction portion".

Program A may be considered as being subdivided into programs A1, A2, A3, A4, . . . with branch instruction portions interposed therebetween. Similarly, program B may be considered as being divided into programs B1, B2, B3, B4, . . . with branch instruction portions interposed therebetween. An END instruction is provided at the end of each of programs A and B. Herein, an "END" instructions is defined as an instruction marking the completion of a program.

Figure 5:
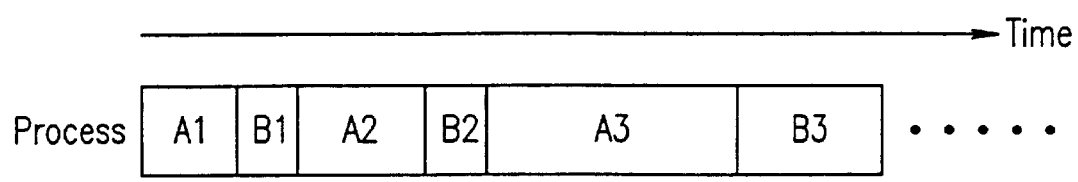
FIG. 5 is a chronological diagram illustrating an exemplary sequence of programs to be processed by a processor incorporating a program controller according to the present invention.

FIG. 5 is a chronological diagram illustrating an exemplary sequence of programs to be processed by the processor 50 incorporating the program controller 100, where branch instruction portions are omitted from illustration. The processes which are performed by the processor 50 for programs A and B will be described with reference to FIG. 5. First, the processor 50 sequentially executes program A1 and the first branch instruction portion contained in program A. Thereafter, the processor 50 sequentially executes program B1 and the first branch instruction portion contained in program B. Then, the processor 50 executes program A2. Thus, programs B2, A3, B3, A4, . . . , etc. will be sequentially executed with the respective branch instruction portions being executed therebetween. Thus, the programs to be executed by the processor 50 are switched between programs A and B so that programs A1, B1, A2, B2, A3, B3, A4, . . . , etc. are sequentially executed. Thus, the processor 50 alternately executes programs A and B in a parallel manner with respect to the time axis.

EXAMPLE 2

Figure 6:
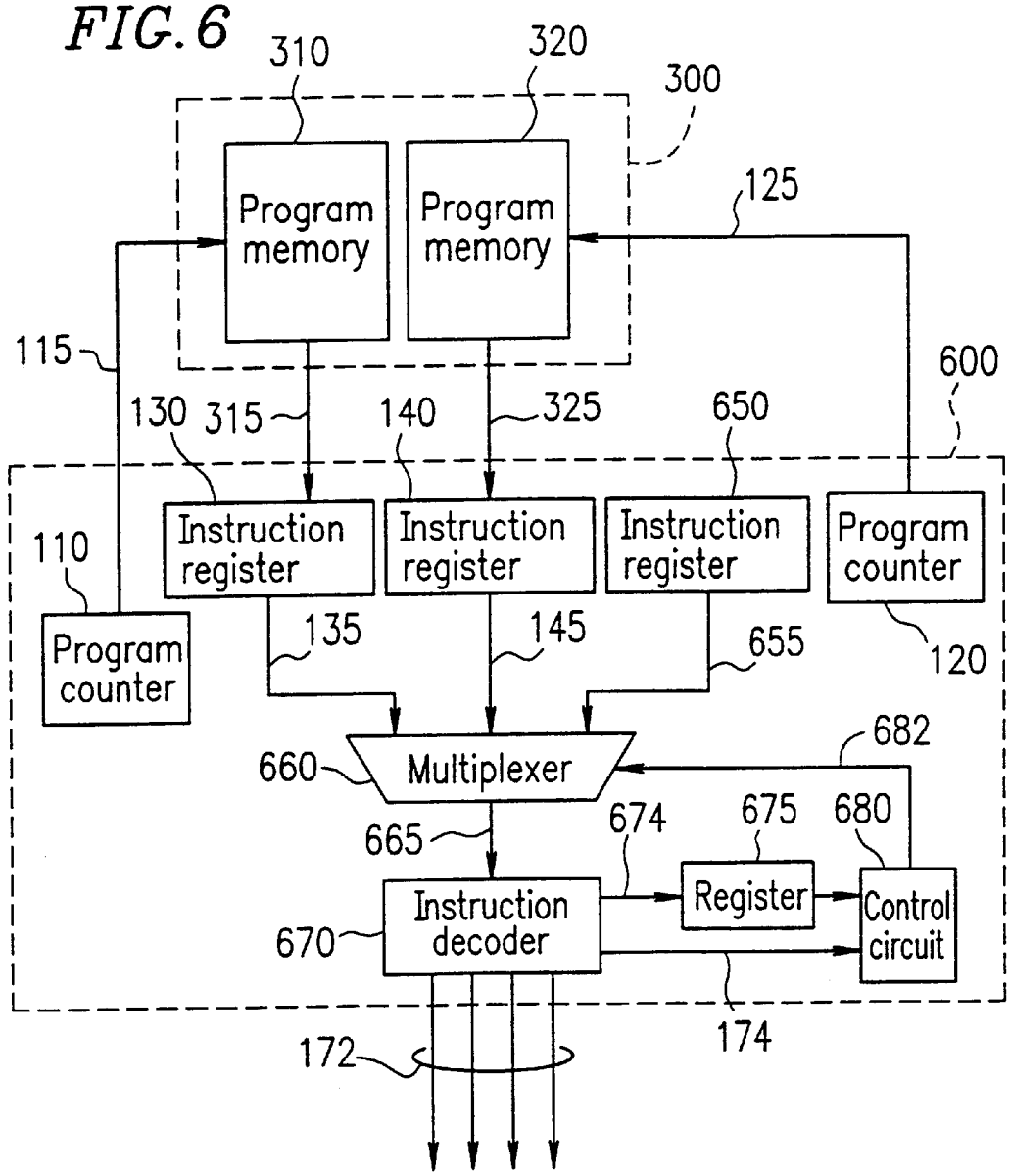
FIG. 6 is a block diagram illustrating the structure of a program controller according to the present invention.

FIG. 6 is a block diagram illustrating the structure of a program controller 600 according to the present invention. The program controller 600 is interchangeable with the program controller 100 of the processor 50 shown in FIG. 1. In FIG. 6, component elements which also appear in FIG. 1 are denoted by the same reference numerals as used therein, and the descriptions thereof are omitted. The operation of the program controller 600 is similar to that of the program controller 100 shown in FIG. 1 in that they both perform pipe-line operations in accordance with the timing scheme shown in FIG. 2. According to the present example, it is assumed that the program memory 310 stores program A and that the program memory 320 stores program B as in Example 1.

Now, those component elements of the controller 600 (FIG. 6) which differ from those shown in FIG. 1 will mainly be described.

An instruction register (NOP instruction retention section) 650 is a register for retaining an NOP instruction. The instruction register 650 outputs the NOP instruction as an instruction 655 to a multiplexer (selection section) 660. Herein, an "NOP instruction" (i.e., a no-operation instruction) is defined as instruction that does not instruct the processor 50 to execute any calculations.

The multiplexer 660 selects one of the instruction 135 (output from the instruction register 130), the instruction 145 (output from the instruction register 140), and the instruction 655 (output from the instruction register 650) for execution. The selected instruction is output as an instruction 665 to an instruction decoder (determination section) 670. The selection operation by the multiplexer 660 is controlled by a 2-bit control signal 682 which is output from a control circuit (control section) 680. When the value of the control signal 682 is "0", the multiplexer 660 selects the instruction register 130; when the value of the control signal 682 is "1", the multiplexer 660 selects the instruction register 140; and when the value of the control signal 682 is "2", the multiplexer 660 selects the instruction register 650.

A register (information retention section) 675 is a register for retaining the end state of programs, i.e., whether the programs have been completed or not. Specifically, a predetermined value which is in accordance with the completed program is set in the register 675 based on a control signal 674. After the lapse of one cycle, the register 675 stores the value of the control signal 674. If neither one of the programs stored in the program memories 310 and 320 is completed, "0" is set in the register 675; if only the program stored in the program memory 320 is completed, "1" is set in the register 675; if only the program stored in the program memory 310 is completed, "2" is set in the register 675; and if both of the programs stored in the program memories 310 and 320 are completed, "3" is set in the register 675.

FIG. 7 is a table illustrating various operations of the control circuit 680 in the controller 600. The control circuit 680 outputs the control signal 682 to the multiplexer 660. As the value of the control signal 174 rises from "0" to "1", the control circuit 680 changes the value of the control signal 682 after the lapse of two cycles. The operation by the control circuit 680 of generating the control signal 682 varies in accordance with the value retained in the register 675. Specifically, if the value in the register 675 is "0", the control circuit 680 inverts the value of the control signal 682 between "0" and "1"; if the value in the register 675 is "1", the control circuit 680 maintains the value of the control signal 682 at "2" for four cycles and thereafter changes it to "0"; and if the value in the register 675 is "2", the control circuit 680 maintains the value of the control signal 682 at "2" for four cycles and thereafter changes it to "1". The control signal 682 controls the operation of the multiplexer 660 so that the processor incorporating the controller 600 executes a program which is selected in accordance with the value of the control signal 682.

The operation of the controller 600 in the case where "0" is retained in the register 675 is the same as that of the controller 100 in the processor 50 according to Example 1. It is assumed that the processor incorporating the controller 600 includes a calculator equivalent to the calculator 200 according to Example 1.

Figure 8:
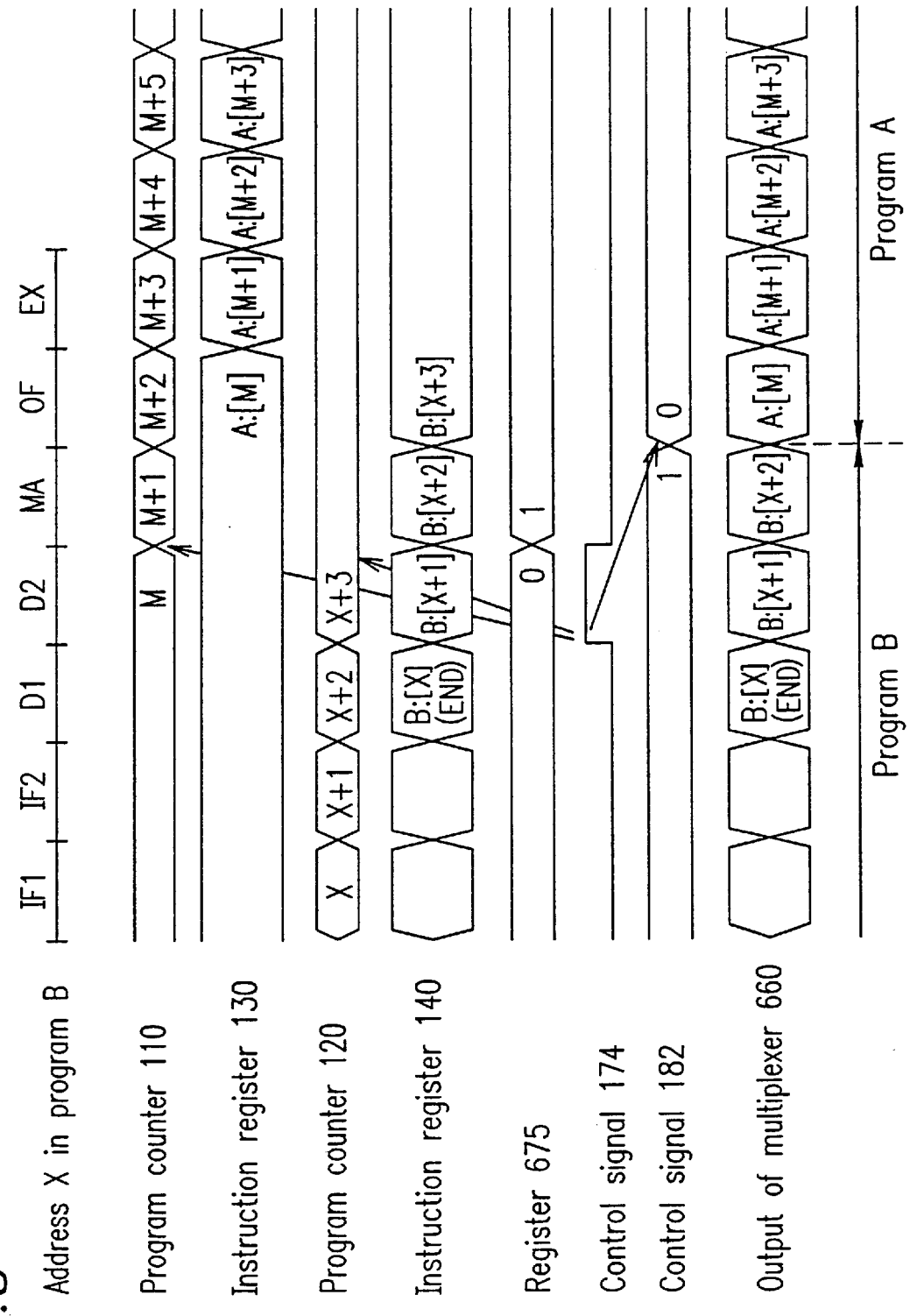
FIG. 8 is a timing diagram illustrating an operation of a program controller according to the present invention.

FIG. 8 is a timing diagram illustrating an operation of the program controller 600 where the program controller 600 has read an END instruction. It is assumed that the END instruction which has been read by the program controller 600 was stored at address X in the program memory 320, and that address X in the program memory 320 is located at the bottom of program B. Hereinafter, the operation of the controller 600 where the processing of program B has been completed will be described with reference to FIG. 8. The incremental operations of the program counters 110 and 120 are similar to that in Example 1, and the description thereof is omitted. While the processor incorporating the controller 600 is executing program B, the value of the control signal 682 stays at "1"; that is, the instruction register 140 is being selected by the multiplexer 660. The processor is to execute the END instruction existing at the bottom of program B in this state. It is assumed that the END instruction is stored at address X in the program memory 320.

Once decoding an END instruction, the instruction decoder 670 changes the value of the control signal 174 to "1". Since the value of the register 675 is "0", as the control signal 174 shifts from "0" to "1", the control circuit 680 changes the value of the control signal 682 to "0" after the lapse of two cycles. When decoding an END instruction, the instruction decoder 670 also changes the value of the control signal 674 to "1". The register 675 stores the value "1" one cycle after the control signal 674 shifts to "1".

If the control signal 682 shifts to "0", the multiplexer 660 selects the instruction 135 which is output from the instruction register 130. The multiplexer 660 outputs the content of the instruction 135 to the instruction decoder 670 as the instruction 665.

Accordingly, the multiplexer 660 selects the instruction 135 (output from the instruction register 130) two cycles after the instruction decoder 670 decodes an END instruction. Therefore, the two instructions B:[X+1] and B:[X+2] following the END instruction B:[X] are read from the program memory 320 to the instruction register 140 following the END instruction, so as to be input to the instruction decoder 670. After the instruction B:[X+2] is input to the instruction decoder 670, an instruction which has been read from the program memory 310 to the instruction register 130 is input to the instruction decoder 670. If a value "M" was retained in the program counter before decoding of the END instruction by the instruction decoder 670, the instruction which is input to the instruction decoder 670 following the instruction B:[x+2] is A:[M].

Thus, the order of the instructions which are executed by the processor incorporating the controller 600 following the END instruction B:[x] will be B:[X], B:[X+1], B:[X+2], A:[M], A:[M+1], A:[M+2], A:[M+3], . . . etc.

As described above, in the case where an END instruction is decoded by the instruction decoder 670, the execution of program A is begun after the execution of two instructions subsequent to the END instruction of program B, just as in the case where a branch instruction is decoded.

Figure 9:
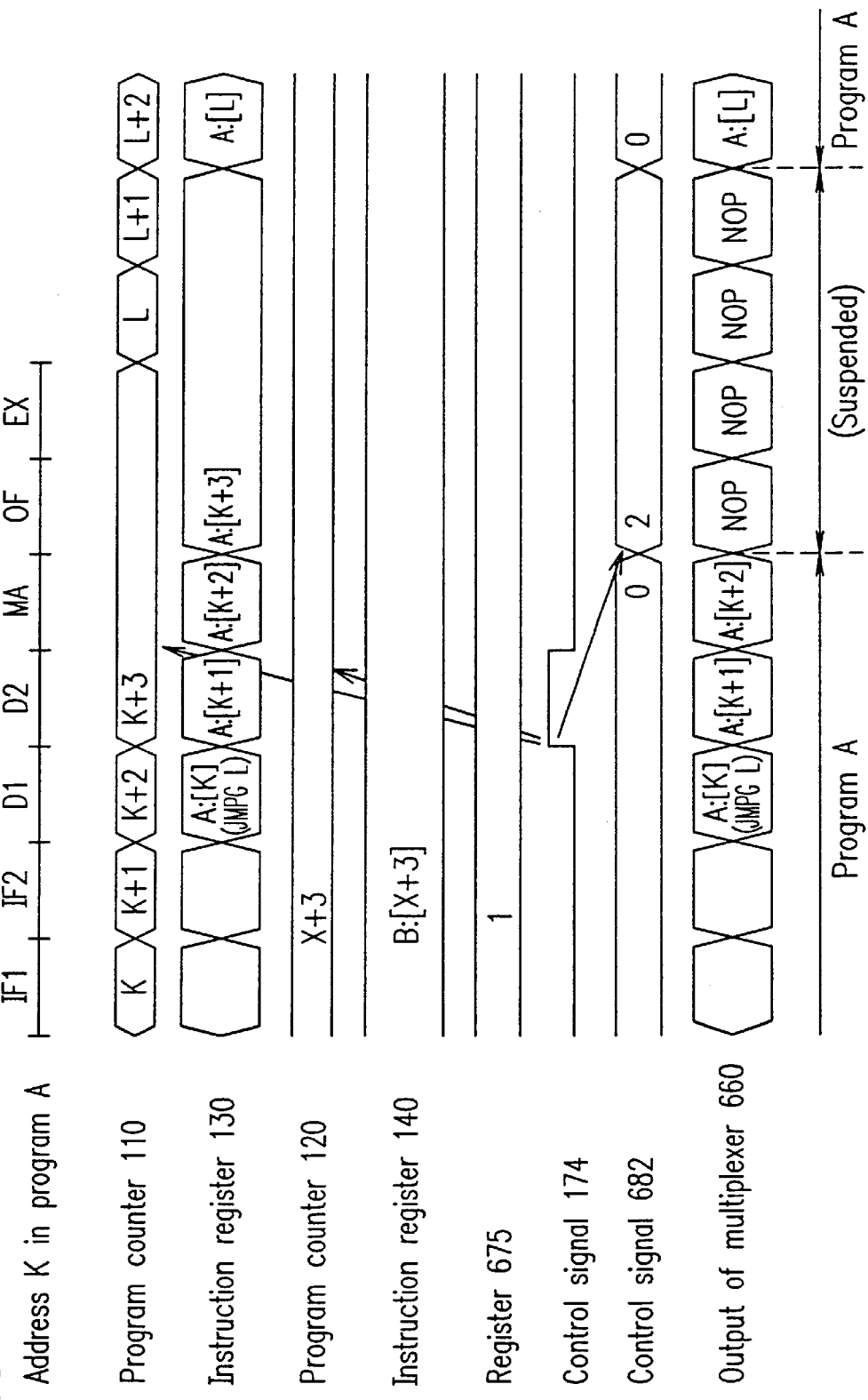
FIG. 9 is a timing diagram illustrating an operation in which a program controller according to the present invention has read a branch instruction.
Figure 10:
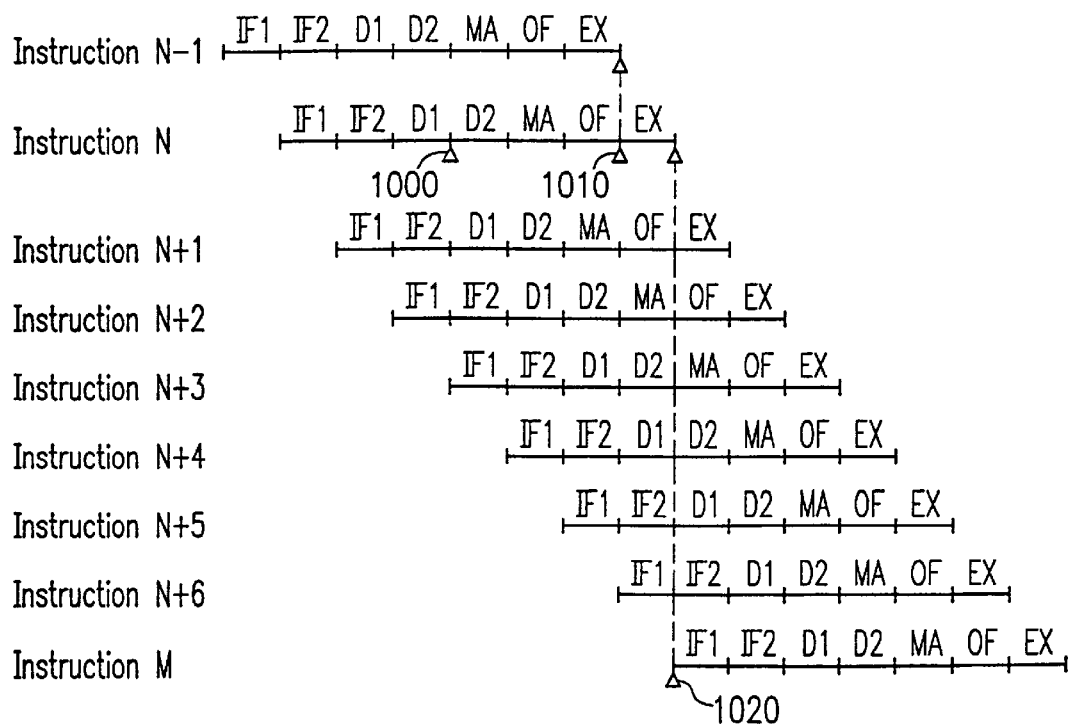
FIG. 10 is a timing diagram illustrating an operation of a conventional program controller.

FIG. 9 is a timing diagram illustrating an operation of the program controller 600 where the program controller 600 reads a branch instruction in program A after program B has been completed. Hereinafter, this operation will be described with reference to FIG. 9.

If the decoded instruction is a branch instruction, the instruction decoder 670 outputs "1" as the control signal 174. It is assumed that the branch instruction A:[K] is an instruction ("JNPG L") to branch out to address L. Since the value of the register 675 is "1", as the value of the control signal 174 rises from "0" to "1", the control circuit 680 changes the value of the control signal 682 after the lapse of two cycles. The control circuit 680 maintains the value of the control signal 682 at "2" for four cycles. Since the multiplexer 660 selects the instruction register 650 while the value of the control signal 682 is "2", the NOP instruction which is retained in the instruction register 650 is output to the instruction decoder 670. Accordingly, the processor incorporating the controller 600 executes four NOP instructions after executing two instructions immediately subsequent to a branch instruction.

The control circuit 680 maintains the value of the control signal 682 at "2" for four cycles and thereafter changes it to "0". As the control signal 682 shifts to "0", the multiplexer 660 selects the instruction register 130 again. Assuming that the branching conditions for the branch instruction A:[K] are met, an instruction A:[L] will be executed after execution of four NOP instructions.

Thus, the order of the instructions which are executed by the processor incorporating the controller 600 following the branch instruction A:[K] will be A:[K], A:[K+1], A:[K+2], "NOP", "NOP", "NOP", "NOP", A:[L], . . . etc.

Thus, when a branch instruction contained in program A is decoded by the instruction decoder 670 after the execution of program B, two instructions subsequent to the branch instruction are executed and four NOP instructions are executed before the execution of program A is resumed.

The operation of the controller 600 in the case where the branch instruction contained in program B is decoded by the instruction decoder 670 after completion of program A is similar to the above-described operation. Therefore, the description thereof is omitted.

As described above, according to the present example, if the processor incorporating the controller 600 decodes a branch instruction in a situation where the execution of either one of programs A and B has been completed with only the other program remaining to be completed, a plurality of NOP instructions are executed before resuming the execution of the latter program. In other words, in the case where the execution of one program is already completed, decoding of a branch instruction does not result in the switching of programs for execution, but rather the processor resumes the execution of the program which needs to be completed.

EXAMPLE 3

Hereinafter, another embodiment of the present invention employing the controller 600 shown in FIG. 6 will be described. Since the operation of the controller 600 according to the present example is much the same as that described in Example 2, only the differences. therebetween will be described.

According to the present example, if the instruction decoder 670 decodes a SET instruction, the instruction decoder 670 sets the value of the control signal 674 at a value of an operand of the SET instruction. Herein, a SET instruction is defined as an instruction dictating a certain manipulation of the value of the register 675. The operand of a SET instruction can take one of the three values: "0", "1", or "2". It should be noted that decoding a SET instruction does not cause the instruction decoder 670 to change the value of the control signal 174.

According to the present example, the use of a SET instruction makes it possible to give higher priority to the execution of one of two programs over the execution of the other. In order to allow program A to be executed with a higher priority, "1" can be set in the register 675 by using a SET instruction (SET 1) contained in program A or program B. In order to allow program B to be executed with a higher priority, "2" can be set in the register 675 by using a SET instruction (SET 2) contained in program A or program B. In order to deny any higher priority for either program A or B, "0" can be set in the register 675 by using a SET instruction (SET 0) contained in program A or program B.

The operation of the controller 600 after a value has been set in the register 675 with a SET instruction is similar to the operation according to Example 2, as described briefly below.

If "0" has been set in the register 675 with a "SET 0" instruction, no priority is given to either program A or B. As a result, the programs to be executed by the processor incorporating the controller 600 is switched alternately between programs A and B every time a branch instruction is executed.

If "1" has been set in the register 675 with a "SET 1" instruction, priority is given to program A. As a result, the processor incorporating the controller 600 operates in the same manner as in Example 2 where the execution of program B has been completed. That is, once a branch instruction is decoded by the instruction decoder 670, two instructions subsequent to the branch instruction and four NOP instructions are executed, and thereafter the execution of program A is resumed. Thus, a higher priority is given to program A than program B because the processor executes program A even after executing a branch instruction contained in program A.

If "2" has been set in the register 675 with a "SET 2" instruction, priority is given to program B. As a result, the processor incorporating the controller 600 operates in the same manner as in Example 2 where the execution of program A has been completed. That is, once a branch instruction is decoded by the instruction decoder 670, two instructions subsequent to the branch instruction and four NOP instructions are executed, and thereafter the execution of program B is resumed. Thus, a higher priority is given to program B than program A because the processor executes program B even after executing a branch instruction contained in program B.

In all of the above-described examples, the program memories 310 and 320 may simply be different portions of a single program memory. In this case, the memory may include a plurality of input/output ports.

In all of the above-described examples, the present invention is applicable in the case where the number of program counters, instruction registers, program memories, and programs provided in the respective structures is n (where n is an integer is equal to or greater than 2). In the case where n is equal to or greater than 3, the control signals 174 and 182 will each take n different values, and the multiplexer 160 or 660 is a multiplexer having n inputs and one output. The execution order of the programs which are switched after the execution of a branch instruction may cycle, e.g., program A, program B, program C, program A, program B, program C, . . . etc., or may be any arbitrarily prescribed order.

The values of the control signals 174 and 182, and the like are not limited to those described above; the program controller of the present invention can operate under the above-described principles regardless of the specific values used for such control signals. The number of pipe-line stages in the processor is not limited to seven. The denotations of instructions such as "JMPG" and "NOP" are not limited thereto.

The present invention is also applicable to branch instructions other than jump instructions such as those illustrated in the above examples. For example, the present invention is also applicable to a subroutine call instruction for branching out to a specific subroutine while storing away an address of a program memory to return to in a specific memory means. Although the instruction registers 130 and 140 illustrated in the above examples each retain one instruction, each of them may retain a plurality of instructions. That is, the present invention is also applicable to the case where a plurality of instructions are read from the program memory 310 or 320 through one access to control a plurality of calculators (as exemplified by a VLIW instruction set), and the case where a plurality of instructions are read through a number of accesses in such a manner that one instruction is executed when a certain set of conditions are met (as exemplified by an OUT OF ORDER execution).

Thus, in accordance with a program controller of the present invention, a first memory section outputs an instruction contained in a first program including a plurality of instructions, and a second memory section outputs an instruction contained in a second program plurality of instructions, the first program being different from the second program. A selection section selects either the instruction which is output from the first memory section or the instruction which is output from the second memory section. A determination section determineswhether or not the instruction selected by the selection section is an instruction for controlling the execution order of instructions. A control section controls the selection section so as to switch from the selected instruction to the unselected instruction of either the first memory section or the second memory section if the instruction selected by the selection section is determined as an instruction for controlling the execution order of the instructions. As a result, the number of delay slots that are required for instructions for controlling the execution order of instructions can be advantageously reduced in a processor operating on pipe-line principles. As a result, the execution efficiency of instructions for controlling the execution order of instructions is improved without providing complex control mechanisms or the like, whereby the total execution time of the first and second programs is reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. The program controller for use in a processor operating on pipe-line principles, comprising:
    a first memory section for outputting an instruction contained in a first program including a plurality of instructions;
    a second memory section for outputting an instruction contained in a second program including a plurality of instructions, the first program being different from the second program;
    a selection section for selecting either the instruction which is output from the first memory section or the instruction which is output from the second memory section;
    a determination section for determining whether or not the instruction selected by the selection section is an instruction for controlling the execution order of instructions; and
    a control section for, if the instruction selected by the selection section is determined as an instruction for controlling the execution order of instructions, controlling the selection section so as to switch from the selected instruction to the unselected instruction of either the first memory section or the second memory section.

2. A program controller according to claim 1, wherein the instruction for controlling the execution order of instructions is an instruction dictating branching out to a predetermined address.

3. A program controller according to claim 1, wherein the instruction for controlling the execution order of instructions is an instruction dictating storing an address of an instruction to be executed next in a memory device and branching out to a predetermined address.

4. A program controller according to claim 1, wherein the control section controls the selection section so as to switch from the selected instruction to the unselected instruction of either the first memory section or the second memory section when the execution of one of the first and second programs is completed.

5. A program controller according to claim 4 further comprising:
    an information retention section for retaining information indicating that the execution of at least one of the first and second programs is completed; and
    an NOP instruction retention section for outputting an NOP instruction,
    wherein, in a situation where the information retained by the information retention section indicates that the execution of the second program is completed and the instruction selected by the selection section is the instruction which is output from the first memory section, and if the determination section determines that the instruction selected by the selection section is an instruction for controlling the execution order of instructions, the control section controls the selection section so as to select the NOP instruction output from the NOP instruction retention section for a predetermined number of cycles and thereafter select the instruction which is output from the first memory section.

6. A program controller according to claim 1, wherein the control section controls the selection section so as to switch from the selected instruction to the unselected instruction of either the first memory section or the second memory section when priority is given to the execution of one of the first and second programs over the other one of the first and second programs.

7. A program controller according to claim 6 further comprising:
    an information retention section for retaining information indicating priority for the execution of the first program and priority for the execution of the second program; and
    an NOP instruction retention section for outputting an NOP instruction,
    wherein, in a situation where the information retained by the information retention section indicates that priority is given to the execution of the first program over the second program and the instruction selected by the selection section is the instruction which is output from the first memory section, and if the determination section determines that the instruction selected by the selection section is an instruction for controlling the execution order of instructions, the control section controls the selection section so as to select the NOP instruction output from the NOP instruction retention section for a predetermined number of cycles and thereafter select the instruction which is output from the first memory section.

* * * * *